United States Patent Office 2,941,661
Patented June 21, 1960

2,941,661

MASKING TAPE

Lloyd E. Picard, St. Marys Point, Minn., and Frank Swedish, Jr., Hudson, Wis., assignors to Minnesota Mining and Manufacturing Company, St. Paul, Minn., a corporation of Delaware No Drawing. Filed Feb. 24, 1959, Ser. No. 794,861

2 Claims. (Cl. 206—59)

This invention relates to pressure-sensitive adhesive masking tape characterized by having a novel creped paper backing; and it also relates to the novel creped paper per se.

Masking tapes, supplied in roll form, have been commercially used on a large scale for many years. The conventional backing is a porous creped saturating paper, similar to absorbent towelling paper, that is impregnated and unified by a flexible and stretchable composition which binds the fibers together, so as to unify and strengthen the paper and provide smooth tape edges, and which provides a barrier to penetration by lacquer solvents and the like. The back surface is commonly given a thin coating of shellac or a synthetic resin to reduce the force required to unwind the tape, this coating being termed a backsize. The backsize generally serves also to provide a continuous sealing coat (the surface of the impregnated paper being somewhat porous) which increases the barrier action of the backing toward lacquer solvents and which renders it smoother. The front or face surface is commonly given a primer coating to improve the bonding of the adhesive coating, and is coated with a normally tacky and pressure-sensitive rubbery-base adhesive.

Such masking tapes are widely used in connection with painting operations to mask various surface areas from the applied paint, lacquer, varnish or enamel, and following drying or curing, often involving a baking operation, the tape is stripped off.

The dry rubbery-base pressure-sensitive adhesive coating is aggressively tacky in its normal state at normal temperatures, so that the tape strongly adheres to the surface upon mere finger pressing without need of heating or moistening. This adhesive is stretchable and highly cohesive, permitting unwinding and removal of the tape without offsetting or transfer of adhesive and permitting handling without gumming the fingers. The unified backing does not rupture or delaminate when the tape is unwound from the roll or removed from surfaces to which applied, despite the force exerted by the aggressively tacky adhesive which resists unwinding and removal. The unified creped paper backing, as well as the adhesive, has a "dead-stretch" (as distinguished from a "live-stretch" such as that of rubber bands) and this permits of conformation to curved or irregular surfaces and permits the tape to be applied so as to define a stable curved masking edge when desired. The tape is readily tearable so that a workman need only use his fingers to obtain a piece of tape from the roll.

The impregnants heretofore commonly used for saturating and unifying the preformed porous creped saturating paper have been of two types. The first type is essentially a fluxed blend of broken down rubber (natural or synthetic), compatible thermoplastic tackifier resin (such as rosin), and zinc oxide, applied as a solution in a hydrocarbon solvent. The second type is a synthetic rubbery polymer applied as a solution in an organic solvent or, more commonly, as an aqueous dispersion or latex, such as a rubbery butadiene-acrylonitrile polymer (Buna–N) or a rubbery acrylate polymer. The impregnant may include vulcanizing agents. In some instances a non-rubbery sub-polymer has been employed which, after impregnation of the paper, has been polymerized or vulcanized to a rubbery state. These various impregnants have penetrated the pores and interstices of the preformed fibrous paper structure to glue the fibers together and also to provide a filler having the desired barrier action to impede penetration by lacquer solvents in use of the tape. The weight of the dried impregnant found necessary is generally in the range of about 50 to 100% of the weight of the untreated paper, i.e., 50 to 100% of the fiber weight.

An obviously apparent physical characteristic of prior masking tapes is the creped structure of the paper which imparts a stretch value in the range of about 5 to 12% (by which is meant the percent elongation when the tape is pulled by hand until it ruptures). The number of crepe lines per inch of length has been in the range of about 15 to 30. The back of the tape has had rugosities or wrinkles of a number and size such that they are not only plainly visible but make for a rough feel when the tape is stroked or rubbed with the fingers, the thin backsize coating not rendering the surface smooth. This roughness is objectionable since many users complain that finger irritation is caused when large amounts of tape are applied day after day.

The present invention provides a novel porous creped saturating paper which has an extremely fine crepe and flatness and a surface smoothness not found in the aforesaid prior commercial masking tape papers. A thinner paper for a given basis weight is obtainable. Masking tapes made therefrom are flatter and smoother and can be used day after day by the workman without irritating the fingers. The flatness of the paper permits of using a lower coating weight of adhesive which also contributes to obtaining a thinner tape. The tape has an exceptionally soft and pliant feel when being unwound from the roll and applied. A clean sharp line of demarcation is obtained at the juncture of painted and masked surface areas which prevents fluid paint or lacquer from seeping under the tape or building up on the edges, whether the tape be applied to provide straight or curved masking edges. Rolls of the present tape have good stability. The flat surface of the paper permits of better print definition than is possible with conventional creped paper tape backings of the same degree of stretch.

These features are made possible by our discovery that a kraft saturating-paper furnish containing a small proportion by weight of water-dispersible deacetylated karaya gum relative to the fiber weight, provides a paper sheeting which can be wet-creped at the wet end of the paper making machine (prior to drying) so as to provide an extremely fine, flat and smooth degree of creping. This may be referred to as a super-fine crepe. The uncreped wet paper is formed so as to provide a creped paper having a dry basis weight of about 25 to 35 pounds per ream (320 square yards) corresponding to about 80 to 110 pounds per thousand square yards. Very little of the gum is retained in the paper product.

The term "wet-creped" is employed herein to designate paper that has been creped during an intermediate stage of manufacture while still damp or wet, as distinguished from finished paper that has been rewet and creped. The desired present paper cannot be creped in the latter manner to obtain a similar or equivalent product.

The desired creping can be performed on the wet press roll with a thin and sharp creping blade so as to impart about 40 to 60 crepe lines per lineal inch, and to provide rounded crepe ridges on one side and a flat appearing reverse side which, instead of having sharp ridges, has minute cup-shaped pockets; both sides of the paper appearing more like flat paper than creped paper. This structure is retained during subsequent drying of the creped paper, following which it is preferably calendered to reduce the caliper thickness and to impart a still higher degree of smoothness.

The resultant creped saturating paper is well adapted to be employed in any of the usual manufacturing procedures for producing masking tape as previously described: the paper web being impregnated with a unifying material, and generally being backsized and primed, and being coated with a pressure-sensitive adhesive, following which the dried web is slit and wound into rolls of desired width and length. Either side of the paper can serve as the backside of the tape since both sides are relatively flat and smooth. When maximum smoothness of the backside of the tape is desired, the side having the rounded ridges is used as the faceside upon which the adhesive is coated.

Usage of the present paper is not limited to masking tape manufacture. For instance, it may be used in the manufacture of pressure-sensitive printed label tapes, in which case the flatter side of the paper preferably provides the backside of the tape backing to permit of maximum printability. The paper has general desirability for uses for which its special properties are of importance.

*Example*

The creped saturating paper is made using commercial scale paper mill equipment comprising in connected series a Hollander type beater, a storage chest, a cylinder type paper machine having an endless wet press felt which picks up the wet fiber layer from the cylinder screen and transfers it to a steel wet press roll. This wet press felt is a very fine wool felt adapted to impart only a slight and fine mark to the wet paper web, thereby permitting of a fine creping on the wet press roll, using a thin sharpened stainless steel creping blade having a thickness of 30 mils and a bevelled edge having an angle of 30°, which is oscillated laterally one inch to keep the edge and roll continuously honed. An endless woven cotton belt transfers the wet creped web into a drier section of the machine where the paper is dried by passing around a series of heated steel cylinders, following which it may be passed between calender rolls to reduce the caliper thickness and to render it even smoother.

The beater furnish is prepared by charging the beater with 2960 gallons (24,700 lbs.) of water and 1000 pounds of semi-bleached kraft pulp and giving a light beating, a Williams Freeness value of about 35 seconds (using a 3 gram sample) being desirable. The beaten pulp mixture is then diluted with sufficient additional water to reduce its consistency to approximately 2.75% (weight percent of fibers on dry basis). This furnish is pumped to the storage chest and is ready for running on the paper-making machine, being pumped to the machine chest as required. During the paper-making operation a dilute aqueous dispersion of water-dispersible deacetylated karaya gum is pumped into the furnish in the mixing box of the machine, at a rate which provides approximately 1 to 2% of karaya gum relative to paper-making fibers (on a dry solids weight basis). The consistency of the stock is preferably held at about 0.1% in the cylinder vat during papermaking, and the basis weight is preferably adjusted so that the ultimate creped paper will have a basis weight of approximately 30 lbs. per ream (approximately 95 lbs. per 1000 square yards).

Creping is adjusted to produce an average of about 50 crepe lines per lineal inch, the number ranging between 40 and 60. The paper has a moisture content of about 30-35% at the time of creping. The dried finished paper (weighing 30 pounds per ream) has a caliper thickness of 6 mils before calendering, a lengthwise tensile strength of 14 lbs. per inch width, and a lengthwise stretch value (elongation before break) of 12%. The paper is preferably calendered to reduce the caliper thickness to 4.5 to 5.0 mils and to further increase flatness and smoothness. This does not alter the tensile and stretch values, and does not require severe calendering that would crush the fibers. This paper has an unusually high degree of uniformity of the fiber structure (formation) as is evident from the uniform formation and translucency when a sheet is held up to the light and viewed. This makes for a high degree of uniformity in physical properties and contributes to the high quality of the ultimate masking tape product. The porosity of the paper and its uniformity make for excellent saturating characteristics. The paper product retains only a slight amount of the gum.

The aforesaid gum dispersion is made as follows: To 45 gallons (375 lbs.) of water in a mixing vessel there is added 1.5 lbs. of aqueous ammonia solution (28%) and then 5 lbs. of karaya gum powder is slowly added with rapid mixing to produce a dispersion free from lumps. Aging of the mixture at room temperature for about 3 hours produces a ropey, syrupy liquid, which is then diluted by mixing in 330 gallons (2750 lbs.) of water. This dispersion contains approximately 0.16% by weight of deacetylated karaya gum (on a dry basis) and is ready for use. During the aging step, the ammonia (serving as a mild alkali) hydrolyzes and deacetylates the gum but only to the extent of all or part of the acetyl radicals constituent in it, and the resultant derivative is a water-dispersible colloid having a high degree of coherency as evidenced by the ropey, syrupy state of the dispersion, and has a high deflocculating potency, which distinguish it from the parent gum. The specificity of the deacetylated karaya gum for present usage is shown by the fact that neither the parent gum nor a wide variety of other gums have been found equivalent for this purpose despite the similarity they may have for other usages.

This creped saturating paper has general utility for making masking tape backings. A preferred type of backing is produced by saturating the calendered creped paper web with an aqueous latex dispersion of rubbery butadiene-acrylonitrile polymer as well known to the art. After drying, the impregnated paper is coated on one side with a backsize solution of alcohol-soluble urea-formaldehyde resin plasticized with a non-drying castor oil-modified alkyd resin, followed by heating to dry and cure the backsize to an alcohol-insoluble state (see U.S. Patent No. 2,548,980). It is then preferably primed on the reverse or face side, and is coated with a rubber-resin type pressure-sensitive adhesive; the primer if used) being one that is compatible with both the adhesive and the paper impregnant so as to increase the bonding action, for instance a blend of polychloroprene and oil-soluble heat-reactive phenol-aldehyde resin. After drying of the adhesive coating the web is wound into a large roll. Prior to the adhesive coating operation, the back of the web is preferably further coated with an extremely thin low-adhesion type backsize. This latter exposed second backsize has a lower degree of adhesion to the pressure-sensitive adhesive, facilitating unwinding and slitting of the web to provide the rolls of tape, and permitting the tape product to be more easily pulled from the roll when used. A preferred low-adhesion backsize is applied as a solution in toluol of a copolymer of octadecyl acrylate and acrylic acid having a monomer weight ratio of 3:2 (see U.S. Patent No. 2,607,711), followed by drying.

We claim:

1. An adhesive tape having an impregnated creped paper backing coated with pressure-sensitive adhesive and wound upon itself in roll form, characterized by the feature that said paper has a superfine crepe structure, one side having rounded crepe ridges and the other side being flatter and having minute cup-shaped pockets, the paper having been wet-creped and made from a furnish containing water-dispersible deacetylated karaya gum in small proportion by weight relative to the paper-making fibers.

2. A porous creped saturating paper useful for making masking tape backings, characterized by a superfine crepe structure, one side of the paper having rounded crepe ridges and the other side being flatter and having minute cup-shaped pockets, the paper having been wet-creped and made from a furnish containing water-dispersible deacetylated karaya gum in small proportion by weight relative to the paper-making fibers.

References Cited in the file of this patent

UNITED STATES PATENTS 2,633,430  Kellgren et al. _____ Mar. 31, 1953

FOREIGN PATENTS 753,698   Great Britain _____ July 25, 1956

UNITED STATES PATENT OFFICE

CERTIFICATE OF CORRECTION

Patent No. 2,941,661                  June 21, 1960

Lloyd E. Picard et al.

It is hereby certified that error appears in the printed specification of the above numbered patent requiring correction and that the said Letters Patent should read as corrected below.

Column 3, line 71, for "moisture" read -- solids --.

Signed and sealed this 20th day of December 1960.

(SEAL)
Attest:

KARL H. AXLINE                      ROBERT C. WATSON
Attesting Officer                 Commissioner of Patents